United States Patent
Boggs

(10) Patent No.: US 7,049,709 B2
(45) Date of Patent: May 23, 2006

(54) METHOD AND APPARATUS FOR DISABLING THE DRIVE TRAIN OF A TARGETED MOTOR VEHICLE FROM A REMOTE LOCATION

(76) Inventor: Clayton Boggs, 380 County Rd. 558, Rogersville, AL (US) 35652

( * ) Notice: Subject to any disclaimer, the term of this patent is extended or adjusted under 35 U.S.C. 154(b) by 152 days.

(21) Appl. No.: 10/330,935

(22) Filed: Dec. 30, 2002

(65) Prior Publication Data

US 2004/0124707 A1 Jul. 1, 2004

(51) Int. Cl.
*B60R 25/00* (2006.01)
(52) U.S. Cl. .................................. 307/10.2; 340/426.11
(58) Field of Classification Search ............... 307/10.2, 307/9.1; 340/425.11, 426.11
See application file for complete search history.

(56) References Cited

U.S. PATENT DOCUMENTS

| | | | | |
|---|---|---|---|---|
| 3,687,210 A | * | 8/1972 | Schaefer ..................... | 180/6.44 |
| 4,884,654 A | * | 12/1989 | Durigon ..................... | 180/287 |
| 5,861,799 A | * | 1/1999 | Szwed ....................... | 340/425.5 |
| 6,072,248 A | * | 6/2000 | Muise et al. ................ | 307/10.2 |
| 6,135,226 A | * | 10/2000 | Persichini et al. .......... | 180/167 |
| 6,216,017 B1 | * | 4/2001 | Lee et al. ................... | 455/567 |
| 6,411,887 B1 | * | 6/2002 | Martens et al. ............. | 701/115 |
| 6,414,586 B1 | * | 7/2002 | Yoshizawa ................. | 340/5.2 |
| 6,505,101 B1 | * | 1/2003 | Brill .............................. | 701/2 |
| 2001/0053712 A1 | * | 12/2001 | Yoseloff et al. ................ | 463/1 |

* cited by examiner

*Primary Examiner*—Brian Sircus
*Assistant Examiner*—Brett Squires
(74) *Attorney, Agent, or Firm*—Michael I. Kroll

(57) ABSTRACT

A system for remotely disabling the drive train of a vehicle including an identifier unit which includes a first processor, a scanner connected to the first processor for transmitting a scanning signal and receiving an identification code signal from the vehicle, and a disabling transmitter connected to the first processor for generation of a disabling signal. The system further includes a disabling apparatus connected to a drive train of the vehicle. The disabling apparatus includes an identification tag for receiving the scanning signal and transmitting the identification code signal in response to receipt of the scanning signal, a valve connected to the drive train, and a second processor for receiving the disabling signal and controlling the valve to move the drive train into a neutral gear upon receipt of the disabling signal.

13 Claims, 7 Drawing Sheets

BLOCK DIAGRAM OF THE PRESENT INVENTION

BLOCK DIAGRAM OF THE PRESENT INVENTION

BLOCK DIAGRAM OF THE PRESENT INVENTION

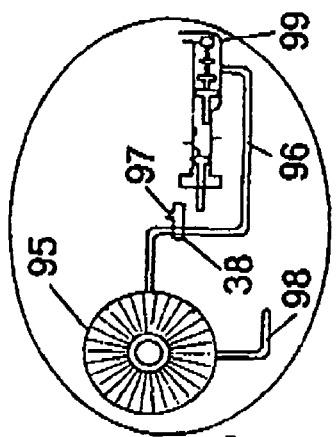
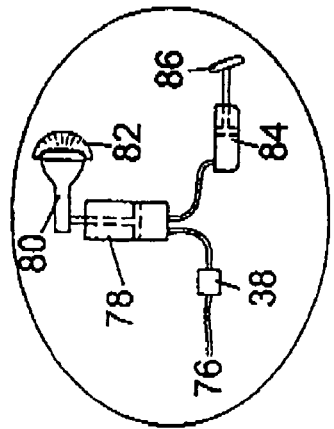
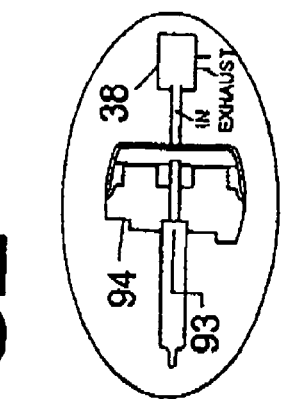
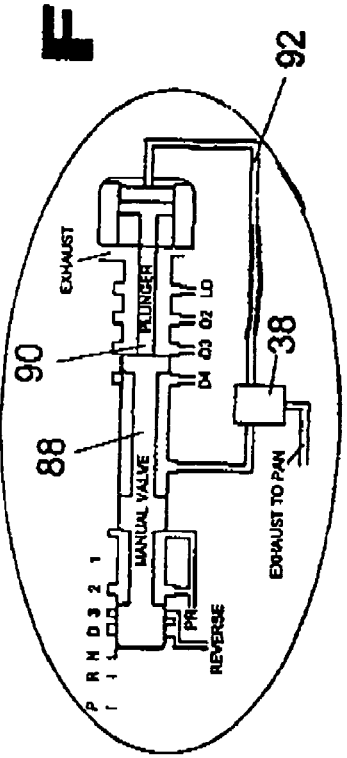

METHOD AND APPARATUS FOR DISABLING THE DRIVE TRAIN OF A TARGETED MOTOR VEHICLE FROM A REMOTE LOCATION

BACKGROUND OF THE INVENTION

1. Field of the Invention

The present invention relates generally to a vehicle disabling device and, more specifically, to a system that remotely disables the drive train of a motor vehicle thereby causing the vehicle to gradually come to a stop. The system can selectively disable a vehicle having either manual or automatic transmission by causing the vehicle to enter the neutral state thereby allowing a user to remain in control of the vehicle. The ideal use of the present invention is by law enforcement officials for reducing the risk caused to people by out of control vehicles.

2. Description of the Prior Art

Numerous vehicle-disabling devices are known in the art. Devices that are known which disable a vehicle are those which disable the vehicle while it is already in a stopped position. Theses devices do not allow the drive train of the vehicle to be engaged once it is in the stopped position. While these devices may be suitable for the particular purpose to which they address, they would not be as suitable for the purposes of the present invention as heretofore described.

SUMMARY OF THE PRESENT INVENTION

The present invention relates generally to a vehicle disabling device and, more specifically, to a system that remotely disables the drive train of a motor vehicle thereby causing the vehicle to gradually come to a stop. The system can selectively disable a vehicle having either manual or automatic transmission by causing the vehicle to enter the neutral state thereby allowing a user to remain in control of the vehicle. The ideal use of the present invention is by law enforcement officials for reducing the risk caused to people by out of control vehicles.

A primary object of the present invention is to provide a vehicle disabling device that overcomes the shortcomings of the prior art.

A second object of the present invention is to provide a system for disabling the drive train of a motor vehicle from a remote location.

An additional object of the present invention is to provide a system for disabling the drive train of a motor vehicle to be used by a law enforcement official.

Another object of the present invention is to provide a system for disabling the drive train of a motor vehicle from a remote location whereby a target vehicle includes a unique vehicle identification device including a unique identification code for easy identification thereof.

Yet another object of the present invention is to provide a system for disabling the drive train of a motor vehicle having an identifier that can scan and detect an identification tag including the unique identification code emitted by the vehicle identification device.

Still another object of the present invention is to provide a system for disabling the drive train of a motor vehicle whereby the identifier includes a processor for interpreting the vehicle identification data captured thereby.

Another object of the present invention is to provide a system for disabling the drive train of a motor vehicle whereby by the identifier has a transmitter for selectively transmitting the unique disabling code to the target vehicle without disabling any other vehicles in the proximity.

Still another object of the present invention is to provide a system for disabling the drive train of a targeted motor vehicle from a remote location that allows the driver to maintain control of the vehicle as it slows to a stop.

Still yet another object of the present invention is to provide a method and system for disabling the drive train of a motor vehicle for use as an anti-theft device which renders the vehicle immobile by preventing the drive train from being moved from the park or neutral position.

Still another object of the present invention is to provide a method and system for disabling the drive train of a motor vehicle that can disable both automatic and standard transmissions.

Another object of the present invention is to provide a system for disabling the drive train of a motor vehicle that can be manufactured in new vehicles and retrofit to existing vehicles.

Still another object of the present invention is to provide a method for disabling the drive train of a vehicle using the system for disabling the drive train of a vehicle.

Yet another object of the present invention is to provide an system for disabling the drive train of a motor vehicle from a remote location that is economical in cost to manufacture and operate.

One more object of the present invention is to provide a method and system for disabling the drive train of a motor vehicle from a remote location that is simple and easy to use.

Additional objects of the present invention will appear as the description proceeds.

The present invention overcomes the shortcomings of the prior art by providing a system for remotely disabling the drive train of a motor vehicle thereby placing the moving vehicle into neutral so that the vehicle will gradually come to stop while the driver of the vehicle still has control of the vehicle.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

Figure 4A:
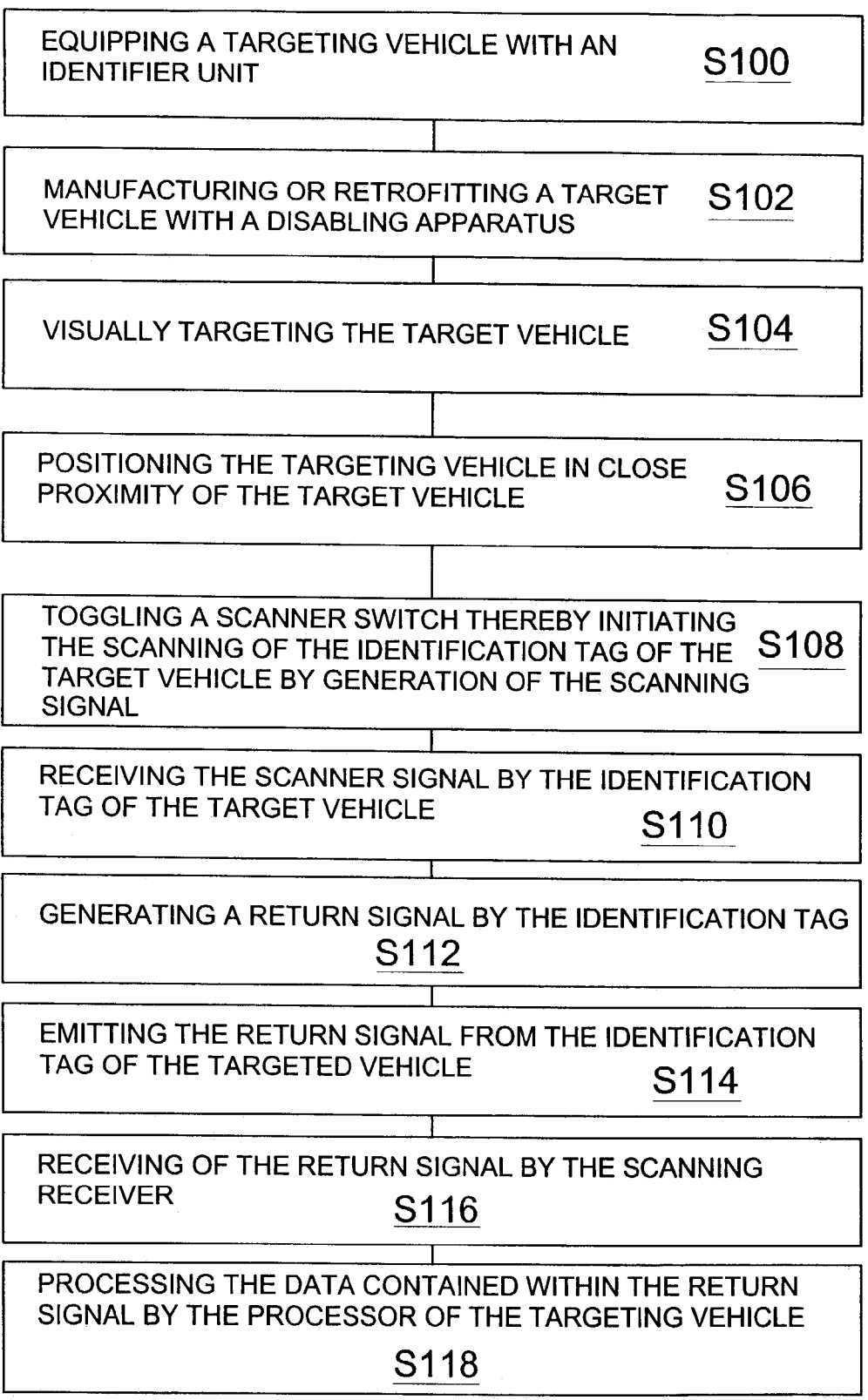
Figure 4B:
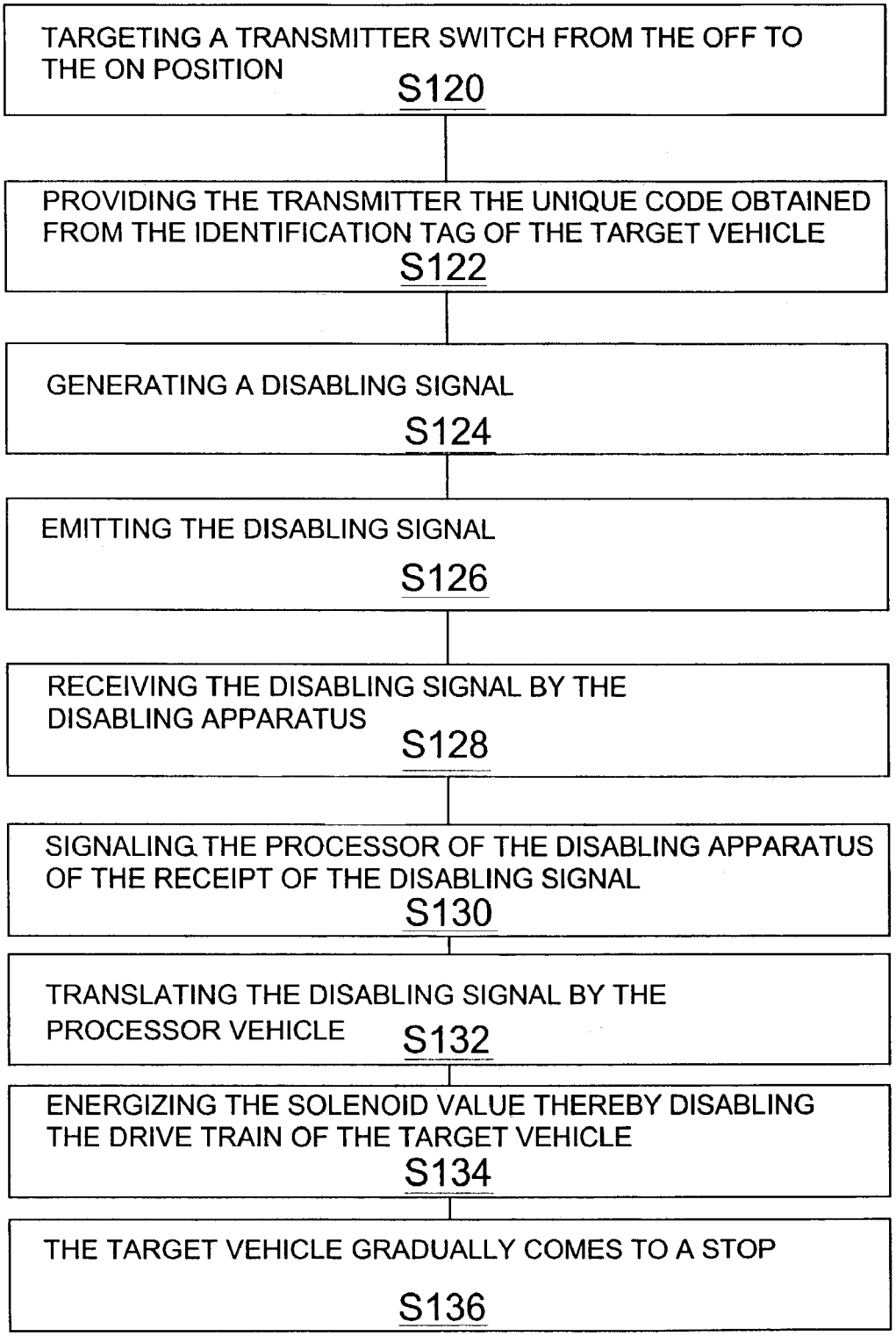
Figure 5:
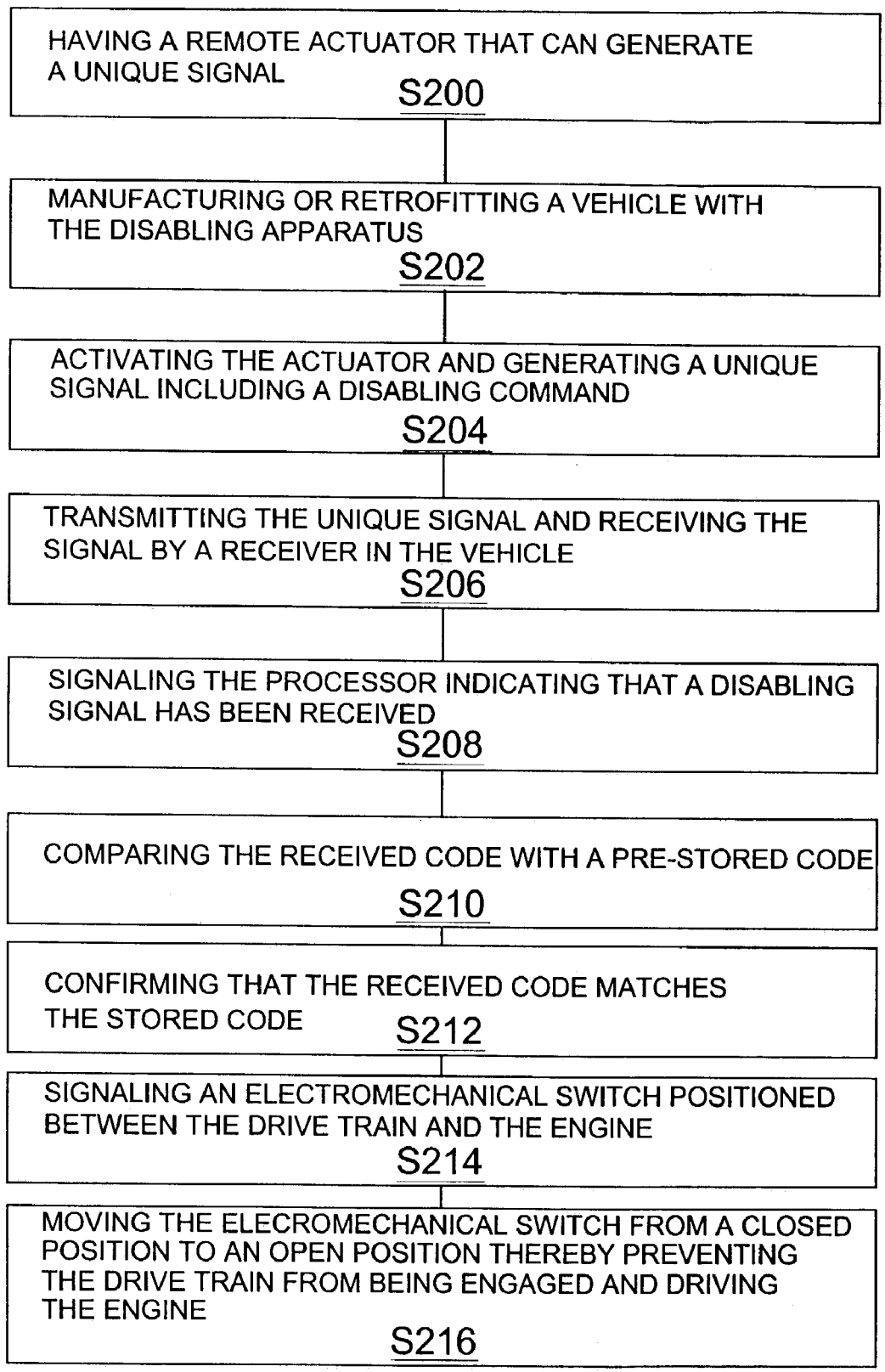
Figure 6:
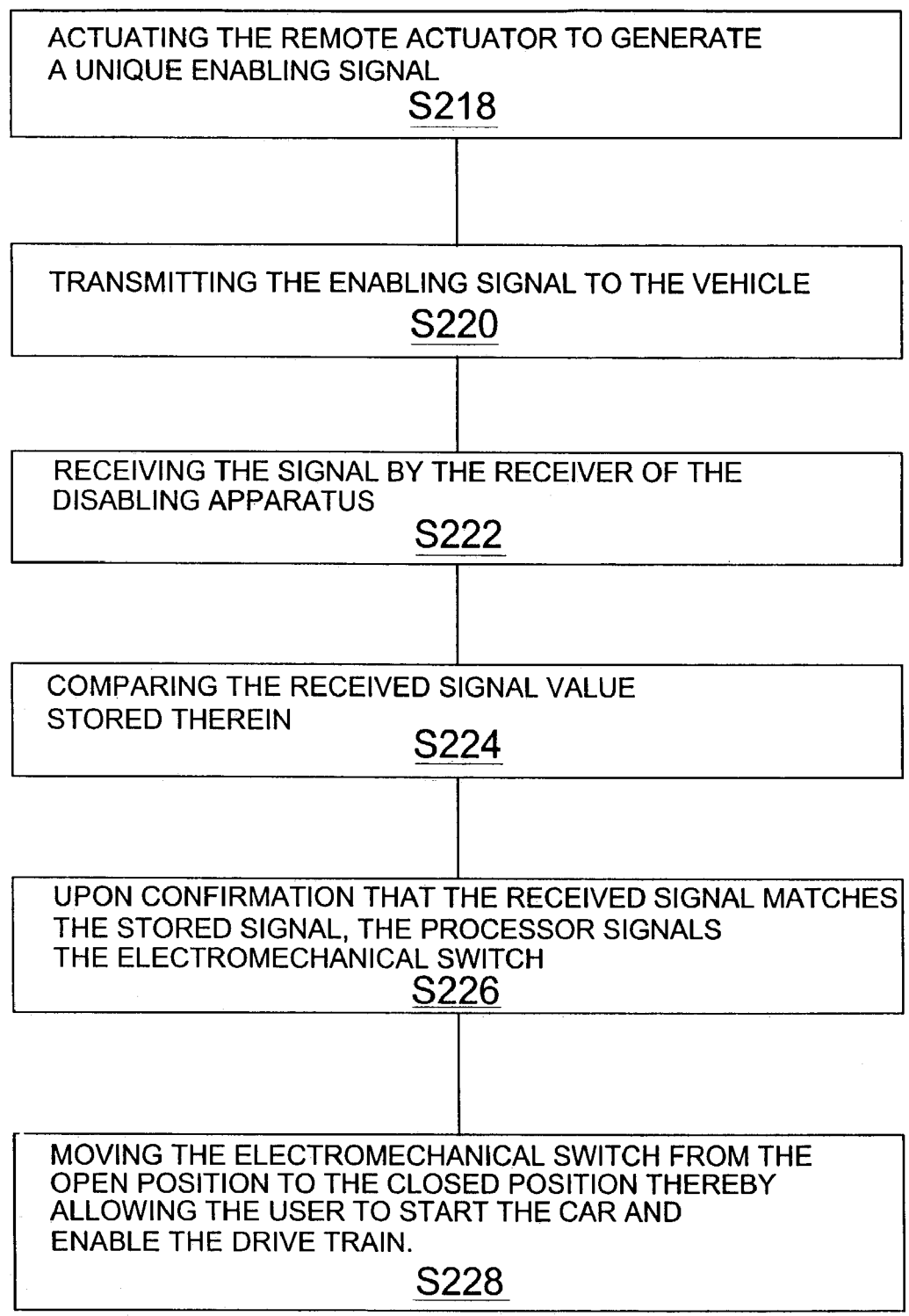

FIGS. 3*a*–3*e* are perspective view of a plurality of transmissions that can each be disabled by the drive train disabling system of the present invention;

FIGS. 4*a* and 4*b* illustrate a flow chart detailing the method of disabling the drive train of a targeted motor vehicle from a remote location using the drive train disabling system of the present invention;

FIG. 5 is a flow chart detailing the method of using the drive train disabling device of the present invention as a security device, and FIG. 6 is a flow chart detailing the method of enabling the drive train of a vehicle which has been disabled as a result of a security device using the drive train disabling device of the present invention.

DESCRIPTION OF THE REFERENCED NUMERALS

Turning now descriptively to the drawings, in which similar reference characters denote similar elements throughout the several views, the Figures illustrate the drive train disabling device the present invention. With regard to the reference numerals used, the following numbering is used throughout the various drawing Figures.

- 10 drive train disabling system of the present invention
- 12 targeting vehicle
- 14 Identifier
- 15 first LED
- 16 power source
- 17 second LED
- 18 scanner on/off switch
- 20 processor
- 22 transmitter on/off switch
- 23 scanner
- 24 scanner transmitter
- 25 scanner signal
- 26 scanner receiver
- 27 return signal
- 28 transmitter
- 29 disabling signal
- 30 target vehicle
- 31 disabling apparatus
- 32 power source
- 33 identification tag
- 34 processor
- 36 receiver
- 38 solenoid valve
- 40 drive train
- 50 remote signaling device
- 52 transceiver
- 54 receiver
- 55 disabling apparatus
- 56 transponder
- 58 switching mechanism
- 60 engine
- 62 drive train
- 70 transmission
- 72 drive shaft
- 74 rear differential
- 76 pump
- 78 slave cylinder
- 80 clutch fork
- 82 clutch
- 84 master cylinder
- 86 pedal
- 88 manual valve
- 90 plunger
- 92 supply line
- 93 servo apply
- 94 forward servo
- 95 vane pump
- 96 pressure line
- 97 exhaust
- 98 suction filter
- 99 shifter

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
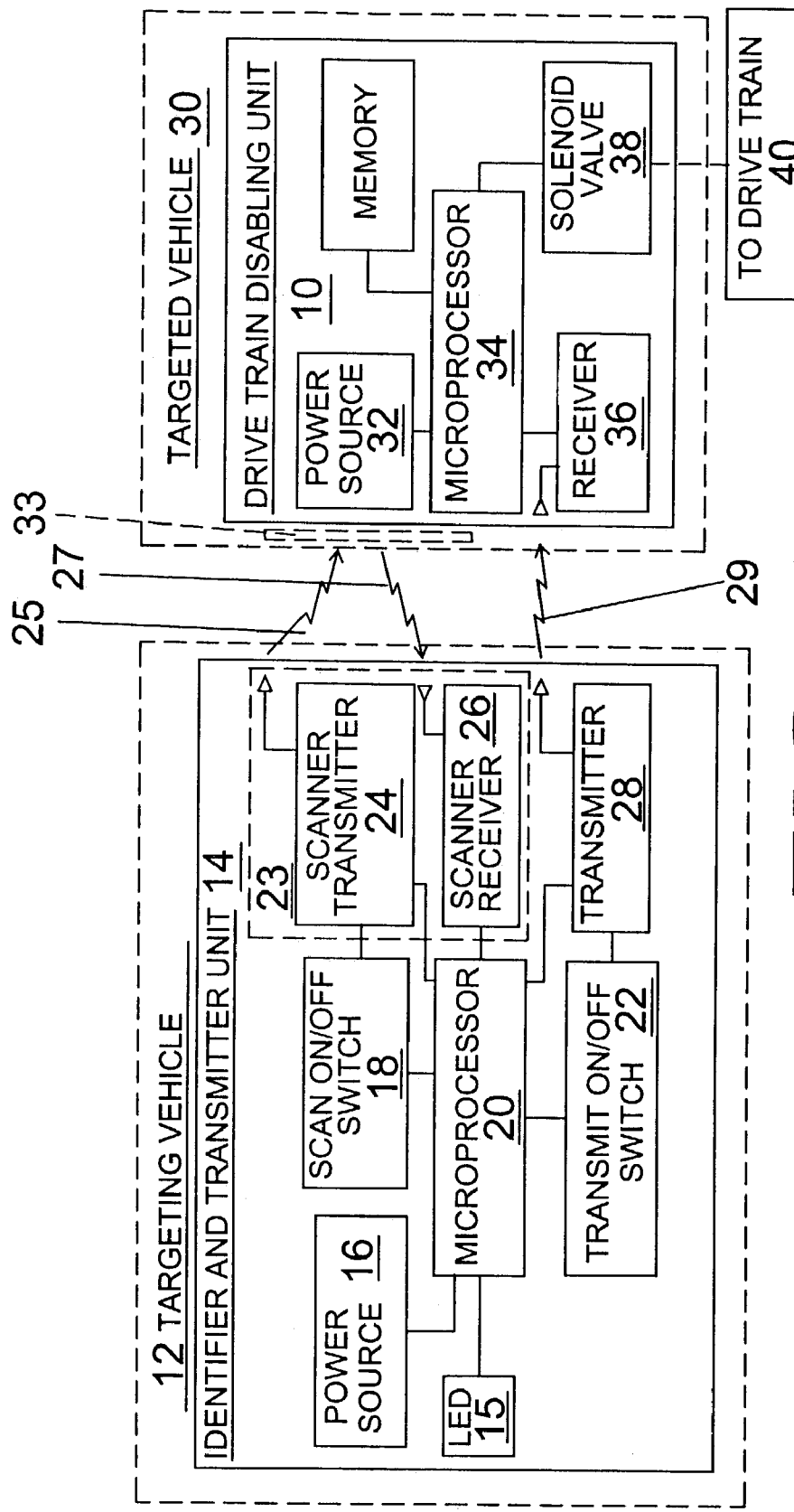
FIG. 1 is a block diagram of the drive train disabling system of the present invention being used to disable a vehicle.

FIG. 1 is a block diagram of the drive train disabling system of the present invention. The drive train disabling system includes a targeting vehicle 12 and a plurality of targeted vehicles 30. The targeting vehicle 12 is able to selective disable the drive train of a desired one of the targeted vehicle 30. The targeting vehicle 12 includes an identifier unit 14. The identifier unit 14 has a power source 16 for providing power to a processor 20. Connected to the processor 20 is a scanner 23 including a scanner transmitter 24 and a scanner receiver 26. A scanner switch 18 is connected between the processor 20 and the scanner 23 for selectively connecting and disconnecting the scanner 23 and the processor 20 upon toggling the scanner switch 18 by a user. When the scanner switch 18 is toggled from the off position to the on position, the scanner 23 is connected to the processor 20 and transmitter 28 is enabled to scan the vicinity for a predetermined targeted vehicle 30. The scanner transmitter 24 transmits a scanning signal in the vicinity of the targeting vehicle 12 upon receipt of the signal from the processor 20, to scan the vicinity and thereby identify vehicles in the area. The scanner receiver 26 is provided for receiving identification signals from targeted vehicles in response to transmission of the scanning signal 25. Preferably the scanner transmitter 24 is mounted to a dashboard of the targeting vehicle 12 or hand held. However, the scanner 23 may be positioned at any place in order to allow for the scanner 24 to send out a scanning signal 24. Furthermore, the scanner 23 can be at least one of an optical scanner or an infrared scanner. However, any style of scanner 23 that can emit a scanning signal 24 may be used. A transmitter 28 is also connected to the processor 20 via a disabling transmitter switch 22 for transmitting a disabling signal 29 to an identified targeted vehicle. A display 15 is also connected to the processor 20 for display of data received from a targeted vehicle.

The targeted vehicle 30 includes an identification tag 33. The identification tag 33 is preferably a bar code. However, anything that may contain data about the vehicle and can be sensed by a scanner may be used as an identification tag 33. Each identification tag 33 in each respective vehicle containing the disabling system 10 of the present invention provides a unique identifier that is readable by the scanner 23. The target vehicle 30 also includes a processor 34 and a receiver 36 connected thereto. The processor 34 in the target vehicle 30 is connected to control the solenoid valve 38 of the drive train 40 of the vehicle.

Under the control of the processor 20 the scanning transmitter 24 of the targeting vehicle 12 emits a scanning signal 25. The scanning signal 25 is received by the identification tag 33 of the target vehicle 30 thereby activating the identification tag 33. Upon activation of, the identification tag 33 a return signal 27 is transmitted back to the targeting vehicle 12 and is received by the scanner receiver 26. The return signal 27 includes data about the target vehicle 30 including a unique identification code. The data contained in the return signal 27 can be at least one of the make and model of the target vehicle, the owner of the target vehicle, place of registration of the target vehicle, and insurance information about the target vehicle. The return signal should also include an identification code for controlling the solenoid valve 38 of the targeted vehicle. However, any information about the target vehicle 30 which may be useful can be contained within the return signal 27. The return signal 27 is received by the scanner receiver 26 of the identifier unit 14. Upon receipt of the return signal 27, the receiver 26 provides the signal to the processor 20 for analysis of the data contained within the return signal 27. The analyzed data is then displays the data on the display 15 connected thereto.

Should the user in the targeting vehicle 12 determine, after viewing the data contained in the return signal 27, that the drive train of the target vehicle 30 should be disabled, the user can toggle the transmitter switch 22 into the on position. The transmitter switch 22 is connected between the processor 20 and the disabling transmitter 28 and upon toggling the transmitter switch 22 is the processor 20 controls the disabling transmitter 28 to transmit a disabling signal 29 including the identification code for disabling the solenoid valve for the targeted vehicle.

The disabling signal 29 is received by the receiver 36 of the target vehicle 30. The received disabling signal 29 is provided to the processor 34 of the target vehicle 30 for analysis. Upon determining the received signal is a disabling signal the processor 34 controls the solenoid valve 38 to disable the drive train 40 by switching the gears of the targeted vehicle into neutral thereby preventing acceleration of the vehicle. The vehicle unable to be returned to normal to operation until it comes to a halt and is restarted.

Upon disabling the drive train 40 and switching the gears into neutral, the vehicle is unable to accelerate and is caused to gradually slow down until the forward motion of the target vehicle 30 is stopped. The disabling system 10 of the present invention can either be added to the vehicle at the time of manufacture or can also be easily added to a pre-existing vehicle. It is preferable that only law enforcement personnel and their vehicles be equipped with the identifier unit 14 of the system 10 of the present invention. It is also preferable that all other vehicles on the road contain the disabling unit 10 of the present invention. The drive train disabling system 10 of the present invention provides a safe method for preventing a person in a vehicle from escaping law enforcement capture or questioning. By causing the drive train 40 of a single vehicle to be disabled, it protects any innocent person in the vicinity and also protects the law enforcement personnel as this system 10 reduces the need for law enforcement personnel to engage in high speed pursuit of suspects. Furthermore, it is safer for the suspect because, as the drive train 40 is disabled and the vehicle is forced into the neutral gear, the suspect in the target car 30 is still able to maintain control of the vehicle.

Figure 2:
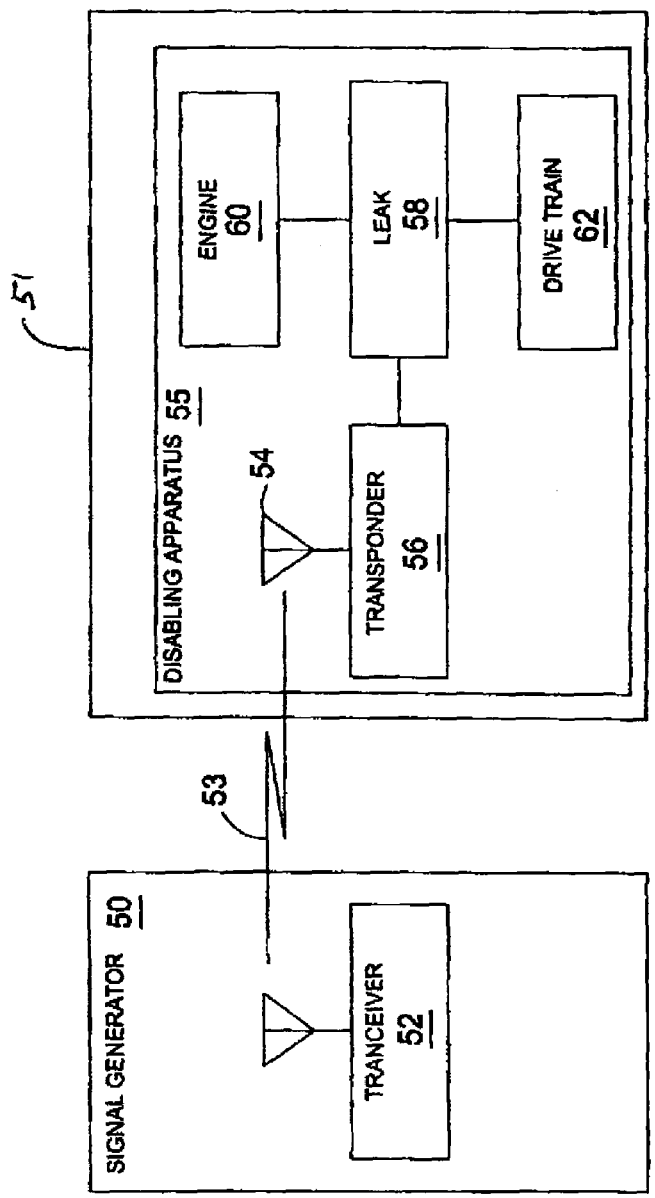
FIG. 2 is a simplified block diagram of the drive train disabling system of the present invention for use as a security device.

FIG. 2 is a block diagram of the drive train disabling system of the present invention further including a security device. As can be seen from this figure the drive train disabling system further includes a signal generator 50 and disabling apparatus 55 positioned within the vehicle. The signal generator 50 includes a transceiver 52. The transceiver 52 generates a predetermine authorization code. This code is only recognized by the disabling apparatus 55 with the vehicle 51. The disabling apparatus 55 includes a transponder 56 connected to an electro/mechanical switch 58. The electro/mechanical switch 58 is connected between an engine 60 and the drive train 62 of the vehicle. When the transponder 56 of the disabling apparatus 55 receives the code generated by the transceiver 52 of the signal generator 50, the transponder 56 toggles the electro/mechanical switch 58 from a first closed position to a second closed position thereby preventing the drive train 62 from being engaged and driving the engine 60 of the vehicle 51. In order to replace the electro/mechanical switch 58 in the open position, the transceiver 52 of the signal generator must transmit a second signal to the transponder 56 causing the transponder 56 to toggle electro/mechanical switch 58 from the second open position to the first closed position. Upon positioning the electro/mechanical switch in the closed position, the drive train 62 can he engaged and thereby drive the engine 60.

FIGS. 3*a* through 3*e* each provide a view of a respective transmission that can be disabled by the drive train disabling system of the present invention. The drive train disabling system as described with specific reference to FIGS. 1 and 2 can be used with a plurality of transmission types in order to disable the drive trains thereof.

FIG. 3*a* shows a rear-wheel drive automatic transmission setup having a transmission 70 and a drive shaft 74 connected thereto. The rear differential is connected to and controlled by the drive shaft 72. A solenoid valve 38 is connected to the drive shaft between the rear differential 74 and the transmission 70. When the disabling apparatus 31 receives a signal that the drive train should be disabled, the solenoid valve 38 is energized and causes the transmission to safely shift the drive shaft into the neutral gear. Thereafter, no more power is provided to the rear differential and the vehicle will come to a gradual stop.

FIG. 3*b* shows a traditional manual transmission having a clutch pedal 86 connected to a master cylinder 84. The master cylinder 84 is connected to the slave cylinder 78. The slave cylinder 78 is connected to and controls the clutch fork 80. The clutch fork 80 engages the gears in of the transmission of the vehicle. A solenoid valve 38 is also connected to the slave cylinder 78 so that when the disabling apparatus 31 of the vehicle receives a disabling signal, the solenoid valve is energized. Thereafter, a pump 76 pumps fluid through the solenoid valve which then controls the slave cylinder 78 so that the clutch fork 80 disengages the drive gears and shifts safely into neutral. The vehicle then gradually comes to a stop.

FIG. 3*c* shows an automatic transmission setup in a vehicle. The automatic transmission includes a manual valve 88 that is moveable by a plunger 90 connected thereto. A supply line 92 connected to the end of the plunger 90 opposite the manual valve 88. The supply line 92 supplies a fluid thereto the manual valve 88 for selectively moving the plunger between the plurality of gears 91. A solenoid valve 38 is connected in series with the supply line 92 and controls the flow of fluid passing therein. Upon receiving a disabling signal, the solenoid valve 38 is energized and causes the fluid to move through the supply line 92 and against the plunger 90. This fluid build up causes the plunger to be moved from a drive gear into the neutral position thereby shifting the car into neutral gear thereby preventing acceleration of the vehicle and ceasing the vehicle to gradually come to a stop.

FIG. 3*d* shows the position of the servo in the transmission of a vehicle. A forward servo 94 is connected between a solenoid valve 38 and a servo apply 93. Upon receiving the disabling signal, the solenoid valve 38 is energized and causes the forward servo 94 to disengage the drive gears thereby placing the transmission in neutral gear. The vehicle is now prevented from accelerating and will then gradually come to a stop.

FIG. 3e shows a vane pump transmission and engine setup. The vane pump 95 has a suction filter 98 connected thereto. The gears of this transmission are control by the shifter 99. A pressure line 96 is connected between the vane pump 95 and the shifter 99. The pressure line 96 has a solenoid valve 38 connected in series. When the vane pump is rotated, fluid is caused to flow through the suction filter 98. The fluid passes through the pressure line 96 and causes the shifter 99 to shift between gears. However, when the vehicle receives a disabling signal, the solenoid valve 38 is energized and additional pressure is placed within the pressure line 96. This additional pressure causes the shifter 99 to disengage the drive gear and the vehicle the neutral gear position thereby preventing acceleration of the vehicle and causing the vehicle to come to a gradual stop.

The method of operation of the drive train disabling system of the present invention will now be described with reference to FIG. 4. FIG. 4 is a flow chart detailing the method of disabling the drive train of a targeted motor vehicle from a remote location. The steps that comprise FIG. 4 are broken up into FIGS. 4a and 4b. FIG. 4b follows directly from FIG. 4a and should be read as one complete figure.

The method of disabling the drive train of a target vehicle begins in FIG. 4a whereby a targeting vehicle is equipped with an identifier unit as shown in step S100. The identifier unit includes a scanning transmitter for generating a scanning signal requesting the identification tag of a target vehicle, a scanning receiver for receiving the identification code signal from the target vehicle, a processor for analyzing the signal received by the scanning receiver, and a transmitter for transmitting a disabling signal in order to selectively disable the drive train of a target vehicle. The identifier unit in step S100 is as described with specific reference to FIG. 1. A target vehicle must then be outfitted with or manufactured with a disabling apparatus as stated in step S102. A disabling apparatus is preferably installed in all vehicles and each disabling apparatus includes an identification tag having unique identification information, a receiver for receiving the disabling signal, a processor for processing the disabling signal and a solenoid valve for disabling vehicle upon receipt of the disabling signal. Upon completion of steps S100 and S102, a user in the targeting vehicle must then visually determine which vehicle will be the target vehicle as stated in step S104. The targeted vehicle identified in step S104 can be any vehicle within a predetermined radius of the targeting vehicle having a disabling apparatus installed therein with.

The targeting vehicle is then positioned in close proximity to the targeted vehicle as discussed in step S106. The user in the targeting vehicle must then toggle a scanner switch therein to initiate the generation of the scanning signal for scanning of the identification tag of the target vehicle as shown in step S108. The identification tag of the targeting vehicle receives the scanning signal as stated in step S110. In response to receipt of the scanning signal the identification tag of the targeted vehicle generates a return signal as recited in step S112. The return signal contains unique identification information about the target vehicle including a specific code with which the targeting vehicle can use to selectively disable the drive train. The return signal is then emitted from the identification tag as shown in step S114 and received by the receiver of the identifier unit as stated in step S116. The data contained within the return signal is processed by the processor of the targeting vehicle as shown in step S118. The processor translates the data within the signal and allows for the display thereof on the LED screen connected to the processor. The processor also removes, the unique code required to selectively disable the drive train of the target vehicle from the return signal.

When the user in the targeting vehicle decides that the target vehicle's drive train should be disabled, the user toggles a transmitter switch as detailed in step S120. In response to toggling the transmitter switch the processor provides the transmitter with the unique code obtained from the identification tag of the target vehicle as stated in step S122. The transmitter then generates a disabling signal as stated in S124 and emits the disabling signal as stated in S126.

The receiver of the disabling apparatus receives the disabling signal as stated in step S128. The disabling signal is provided to the processor of the disabling apparatus for analysis as shown in step S130. The signal is then analyzed by the processor as shown in step S132 whereby the processor determines what action is required by the target vehicle. Upon determination that the signal is a disabling signal, the processor energizes the solenoid valve as stated in step S134 thereby engaging the gears of the drive train of the target vehicle and causing the drive train to switch into neutral. Thereafter, the target vehicle is prevented from accelerating and gradually comes to a stop as stated in step S136.

FIG. 5 is a flow chart detailing the method for disabling the drive train of a vehicle for use as a security device. This method describes the steps required to perform the alternate function of preventing the drive train from being engaged. In order to prevent the drive train from being engaged, a user must be given a remote actuator that can generate a unique signal as stated in step S200. This remote actuator includes a transceiver which generates the unique signal for disabling and re-enabling the drive train of a vehicle. The vehicle must then either have been manufactured with the disabling apparatus or retrofit to include the disabling apparatus as stated in step S202. The remote actuator is activated as shown causing generation of a unique signal transceiver of the remote actuator then transmits the unique signal which is received by a receiver in the vehicle as stated in step S206.

The signal is the provided to the processor upon receipt as recited in step S208. The processor compares the received signal and code and compares the code with a pre-stored code contained therein as discussed in step S210. Upon confirming that the received code matches the stored code as shown in step S212 the processor signals an electromechanical switch which is positioned between the drive train and the engine as shown in step S214. The electromechanical switch is then moved from a closed position to an open position as stated in step S216 thereby preventing the drive train from being engaged and driving the engine.

FIG. 6 is a flow chart detailing the method for enabling the drive train of a vehicle which has been disabled as a result of a security device. To enable the drive train and thereby allow the vehicle to be put in gear and driven normally, the remote actuator must be activated to generate a unique enabling signal as shown in step S218 and the enabling signal is transmitted to the vehicle as shown in step S220. The enabling signal is and received by the receiver of the disabling apparatus in the vehicle as shown in step S222. Upon receipt, the enabling signal is provided to the processor which then compares the received enabling signal with a signal stored therein as shown in step S224. Upon confirmation that the received signal matches the stored signal, the processor activates the electromechanical switch as stated in step S226. The electromechanical switch is controlled moved from the open position to the closed position as stated in step S228 thereby allowing the user to start the car and enable the drive train.

From the above description it can be seen that the present invention overcomes the shortcomings of the prior art by providing a drive train disabling system that includes a targeting vehicle and a plurality of targeted vehicles, whereby the user in the targeting vehicle can remotely disable the drive train of an individual targeted vehicle causing the targeted vehicle to be shifted into the neutral gear thereby preventing acceleration of the targeted vehicle and gradually causing bringing the targeted vehicle to cone to a stop. The system further allows for the user in the targeting vehicle to maintain basic control over the targeted vehicle after the drive train thereof has been disabled. Furthermore, the present invention is simple and easy to produce and use.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A system for remotely disabling the drive train of a targeted stolen vehicle consisting of:
   a) an identifier unit in a targeting vehicle including:
      i) a first processor;
      ii) a scanner connected to said first processor for transmitting a scanning signal to scan a vicinity for a predetermined targeted stolen vehicle and receiving an identification code signal from the targeted vehicle; and
      iii) a disabling transmitter connected to said first processor for generation of a disabling signal; and
   b) a disabling apparatus connected to a drive train of the targeted stolen vehicle, said disabling apparatus including:
      i) an identification tag for receiving said scanning signal and transmitting the identification code signal in response to receipt of said scanning signal;
      ii) a valve connected to the drive train;
      iii) a second processor for receiving said disabling signal and controlling said valve to move said drive train into a neutral gear upon receipt of said disabling signal.

2. The system as recited in claim 1, wherein said identifier unit further consists of a scanner switch connected between said first processor and said scanner for selectively activating said scanner.

3. The system as recited in claim 2, wherein said identifier unit further consists of a transmitter switch connected between said first processor and said disabling transmitter for selectively activating said transmitter.

4. The system as recited in claim 3, wherein said scanner consists of a scanning transmitter for transmitting said scanning signal upon toggling of said scanner switch.

5. The system as recited in claim 4, wherein said scanner further consists of a receiver for receiving said identification code signal and providing said identification code signal to said first processor for analysis thereof.

6. The system as recited in claim 5, wherein said identifier unit is positioned within said targeting vehicle.

7. The system as recited in claim 6, wherein said second processor further consists of a receiver for receiving said disabling signal.

8. The system as recited in claim 7, wherein said valve is a solenoid valve.

9. The system as recited in claim 8, wherein said second processor compares said disabling signal with a stored identifier code and when said disabling signal is determined to match the identifier code of said second processor energizes said solenoid valve to move said drive train into neutral gear.

10. The system as recited in claim 9, wherein said identification code signal generated by said identification tag includes information about the target vehicle including at least one of the make and mode) of the vehicle, the owner of the vehicle, place of registration of the target vehicle, and insurance information about the vehicle.

11. The system as recited in claim 10, wherein said identifier unit further consists of an LED display connected to said first processor for displaying information contained in said identification code signal.

12. A method of targeting and remotely disabling a drive train of a previously identified stolen vehicle consisting of the steps of:
   a) scanning an area to identify vehicles in said area using an identifier unit in a targeting vehicle, said identifier unit including a first processor, a scanner connected to said first processor for transmitting a scanning signal to scan the vicinity;
   b) the stolen vehicle in said area transmitting in response to receiving said scanning signal an identification code taken from an identification tag in said stolen vehicle, said identifier unit in said targeting vehicle receiving said identification code signal from the stolen vehicle;
   c) a disabling transmitter in the targeting vehicle sending out a disabling signal unique for said stolen vehicle in response to receiving said identification code;
   d) the stolen vehicle receiving said disabling signal; and
   e) said stolen vehicle using said disabling signal to shift a transmission in said stolen vehicle to a neutral position thereby effectively bringing said stolen vehicle to a stop.

13. The method of claim 12 in which a solenoid valve in said stolen vehicle is used to shift the transmission into neutral.

* * * * *